United States Patent
Cai et al.

(10) Patent No.: US 6,384,157 B1
(45) Date of Patent: May 7, 2002

(54) METHOD OF DETECTING AND CORRECTING LOCAL DEFLUIDIZATION AND CHANNELING IN FLUIDIZED-BED REACTORS FOR POLYMERIZATION

(75) Inventors: Ping Cai, Hurricane; Ivan Jeremy Hartley, St. Albans; Kiu Hee Lee, South Charleston, all of WV (US); Lance Lyle Jacobsen, Lake Zurich, IL (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/571,528

(22) Filed: May 16, 2000

(51) Int. Cl.⁷ .................................................. C08F 2/34
(52) U.S. Cl. ......................... 526/88; 526/68; 526/901; 526/335; 526/341; 526/346; 526/348.2; 526/348.5; 526/348.6
(58) Field of Search .............................. 526/68, 88, 901, 526/335, 341, 346, 348.2, 348.5, 348.6

(56) References Cited

U.S. PATENT DOCUMENTS

| | | | |
|---|---|---|---|
| 4,858,144 A | 8/1989 | Marsaly et al. | 364/496 |
| 5,462,999 A | * 10/1995 | Griffin et al. | 526/68 |

OTHER PUBLICATIONS

Japanese Abstract No. JP07008784A, Hosokawa Micron Corp.*

* cited by examiner

Primary Examiner—David W. Wu
Assistant Examiner—William K Cheung

(57) ABSTRACT

A method is provided to monitor, detect and correct local defluidization and channeling in fluidized-bed reactors for polymerization of olefin and/or diolefin polymers. The detection is preferably conducted by (i) continuously and/or intermittently comparing a signal which is a function of the currently measured fluidization bulk density with a signal which is a function of the time-averaged baselines of fluidized bulk density.

27 Claims, No Drawings

METHOD OF DETECTING AND CORRECTING LOCAL DEFLUIDIZATION AND CHANNELING IN FLUIDIZED-BED REACTORS FOR POLYMERIZATION

FIELD OF THE INVENTION

This invention relates to manufacturing olefin and/or diolefin polymers in fluidized beds, and particularly to detecting and correcting local defluidization and channeling in fluidized beds.

BACKGROUND OF THE INVENTION

One of the most economical and commonly used methods to manufacture polyolefins is gas phase polymerization. Good fluidization conditions are essential for fluidized-bed polymerization reactors. The fluidized-bed reactors to which our invention relates may be quite large with typical production rates of about 12,000 lb/hr to as much as 150,000 lb/hr pounds per hour of polyolefin. Descriptions of "UNIPOL" fluidized-bed reactors (although our invention is not limited to them) may be found in U.S. Pat. Nos. 4,003,712, 4,877,587 and 4,933,149, which are incorporated herein by reference. A typical fluidized-bed reactor used in polymerizing olefins and/or diolefins will include a cylindrical section containing the dense-phase fluidized bed (i.e., the mixture of reaction gas and polymer particles), and an expanded section above the cylindrical section. Monomers and catalyst are introduced into the reactor, forming a small particulate product that becomes suspended in the fluidized bed which is maintained by the continuous introduction of gas through a distributor at the bottom of the bed. Gas is circulated through the fluidized-bed reactor to a heat exchanger to remove the heat generated in the exothermic reaction; the cooled gas is typically continuously returned in order to maintain steady conditions. Product is removed as needed through discharge port(s) usually located near the bottom of the fluidized bed.

In addition to well-known conventional gas phase polymerization processes, "condensing mode", including the so-called "induced condensing mode," and "liquid monomer" operation of a gas phase polymerization can be employed; these involve the introduction of liquid to the fluidized bed or cycle gas stream. The introduced liquid evaporates quickly in the fluidized bed to help remove the heat of reaction. Uniform distribution of fluidizing gas and liquid in the cross-sectional area of the reactor is essential to achieve good fluidization in the bed. Good control over the fluidization conditions of this complex system is necessary to maintain desired production rate and product quality.

Under certain undesirable conditions, localized non-uniform gas and/or liquid distribution can take place in the reactor. A portion of the bed can have insufficient flow of fluid to fluidize particles, resulting in local defluidization. In normal fluidization, particles are suspended by the fluid and are in motion relative to other particles. In a defluidized zone, particles do not move relative to other neighboring particles. Defluidization is therefore defined herein as the status of particles having substantially no motion relative to other particles. Typical defluidization phenomena include channeling and "dead spots. " Channeling is a phenomenon in which fluids rapidly rise in one area of the bed, sometimes carrying particles with them, and can adversely affect the fluidization of other areas of the bed. Channeling even in a small area often adversely affects fluidization in other areas of the bed. Channeling does not need to extend for the entire height of the fluidized bed but may be present in a short length (such as a few, i.e four, inches in height) and may cover only a small portion of the cross section of the bed. Although in places herein we mention both channeling and local defluidization as types of upsets in fluidized beds, channeling is actually a type of local defluidization, and we include it within the meaning of local defluidization, especially as a type of local defluidization. If any area within the bed, especially within the bottom part of the bed, becomes defluidized and channeled (due to non-uniform radial distribution of fluidizing gas, or too much liquid in the bed, for example), temperature uniformity in the bed could be degraded. Variations in temperature can result in a wide range of product characterization and operational difficulty. If those problems are not corrected in a timely manner, polymer agglomerates can form and an expensive premature shutdown of the reactor may be required. In addition, the product quality can also be adversely altered. Therefore, it is desirable to provide a method to detect and correct local defluidization including channeling, in fluidized-bed polymerization reactors.

A few common examples of local-defluidization prone operations include "condensing mode" operation with high levels of condensing, operation with sticky resin particles in the fluidized bed, periods of product transition, and operations with relatively significant variations in operating parameters and particle properties. A reliable method to detect and correct local defluidization including channeling, would allow increased product throughput and improved product quality.

A Japanese patent (JP07-8784) describes the use of a method to detect the "bed collapse" of a fluidized-bed granulator due to channeling, wherein emergency controls are employed to temporarily increase gas jetting flow to return the bed to normal fluidization. According to this patent, a sharp decrease in total bed pressure drop in the fluidized bed may indicate that the bed has been switched to a channeling mode of operation. This patent describes the use of elastic wave theory to measure a sharp change in the vibration of the fluidized bed, which may also indicate the presence of channeling. These techniques are used to detect a drastic conversion to channeling flow in the granulation fluidized bed. This may not serve as an adequate warning for fluidized-bed polymerization reactors where the onset of channeling has to be detected before the channeling is fully developed. The techniques of the Japanese patent do not detect channeling early enough to prevent polymerization degradation.

Another patent (U.S. Pat. No. 4,858,144) describes the process of measuring pressure signals to identify when agglomerates and other large particles are present in a fluidized-bed polymerization reactor. It does not detect local defluidization and channeling problems in order to control them.

Griffin et al., in U.S. Pat. No. 5,462,999, suggest the use of a Z function, which is related to gas density, solid density, settled bulk density and fluidized bulk density, to maintain desired fluidization conditions when running the reactor in condensing mode. However, such a Z function targets on the change of the overall bed properties and can not be used to promptly detect local defluidization and channeling.

This invention provides an innovative and simpler way to detect and correct local defluidization and channeling.

SUMMARY OF THE INVENTION

This invention provides a method of monitoring, detecting, and correcting local defluidization problems, including channeling, in fluidized-bed polymerization reactors for polymerizing at least one alpha olefin or polymerizable diolefin with other optional copolymerizable monomers, comprising polymerizing the monomers in the presence of at least one polymerization catalyst, optionally using "condensing-mode" operation, and also optionally in the presence of an inert particulate material. Our invention is also operable for polymerization of substituted olefins such as styrene, acrylonitrile, and other unsaturated polymerizable monomers mentioned elsewhere herein. Detection of incipient defluidization is conducted by comparing a signal having a value which is a function of currently measured fluidization bulk density with a signal having a value which is a function of a time-averaged baseline of the fluidization bulk density using input data from the same source as the currently measured fluidization bulk density. For certain operations, the time-averaged baseline can also be determined according to historical data selected for its relation to successful production, known as "good" data. While the functions of the measured bulk density may vary, we prefer two particular types of functions.

This invention provides two preferred criteria for monitoring and detecting an incipient local defluidization and/or channeling, and procedures for returning the reactor to normal fluidization. Both are based on functions of fluidized bulk density. The first criterion recognizes the occurrence of local defluidization and/or channeling when the Channeling Index (hereafter sometimes called "Cindex") is larger than about 10%, and the second criterion recognizes the local defluidization and/or channeling when the standard deviation of fluidized bulk density drops more than about 20% from a baseline standard deviation.

DETAILED DESCRIPTION OF THE INVENTION

Polymers and Monomers

Our invention is useful in the polymerization, in fluidized beds, of the following: homopolymers and copolymers of $C_2$–$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more $C_2$–$C_{18}$ alpha olefin; terpolymers of one or more $C_2$–$C_{18}$ alpha olefins with a diene; and the like. Within the $C_2$–$C_{18}$ alpha olefins, our invention is preferentially appropriate for the widely commercialized fluidized bed polymerization process for making polyethylene, polypropylene, and copolymers of ethylene and/or propylene with other lower alpha olefins having up to eight carbon atoms.

Monomers that can be employed in the process can include one or more: $C_2$–$C_{18}$ alpha olefins such as ethylene, propylene, and optionally at least one diene (such as those taught in U.S. Pat. No. 5,317,036 to Brady et al.), for example, hexadiene, dicyclopentadiene, octadiene including methyloctadiene (e.g., 1-methyl-1,6-octadiene and 7-methyl-1,6-octadiene), norbornadiene, and ethylidene norbornene; readily condensable monomers such as those taught in U.S. Pat. No. 5,453,471 including isoprene, styrene, butadiene, isobutylene, chloroprene, acrylonitrile, cyclic olefins such as norbornenes, and the like.

Polymerization Process

Preferably, the present invention is employed in fluidized-bed polymerization reactors that are mechanically stirred and/or gas fluidized, with those utilizing a gas phase being most preferred. The present invention is not limited to any specific type of fluidized-bed polymerization reaction and can be carried out in a single reactor or multiple reactors such as two or more reactors in series. In addition to well-known conventional gas phase polymerization processes, "condensing mode," including the so-called "induced condensing mode," and "liquid monomer" operation of a gas phase polymerization can be employed.

A conventional fluidized-bed process for producing resins is practiced by passing a gaseous stream containing one or more monomers continuously through a fluidized-bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322; 4,035,560; and 4,994,534.

Condensing mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations, a recycle stream, or a portion thereof, can be cooled to a temperature below the dew point in a fluidized-bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants, and the polymer product. The condensed fluid may also include monomers and comonomers, and can be introduced into the reaction/recycle system at any point in the system. Condensable fluids include saturated or unsaturated hydrocarbons.

In addition to condensable fluids of the polymerization process itself, other condensable fluids inert to the polymerization can be introduced to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly, to avoid local defluidization, channeling and other operational problems.

Liquid monomer polymerization mode is disclosed, in U.S. Pat. No. 5,453,471; PCT/US95/09826 and PCT/US95/09827. When operating in the liquid monomer mode, liquid can be present throughout the entire polymer bed provided that the liquid monomer present in the bed is mainly adsorbed on or absorbed in solid particulate matter present in the bed, such as polymer being produced or inert particulate material (e.g., carbon black, silica, clay, talc, and mixtures thereof) present in the bed, as long as there is no substantial amount of free liquid monomer present. Liquid monomer mode makes it possible to produce polymers in a gas phase reactor using monomers having condensation temperatures much higher than the temperatures at which conventional polyolefins are produced. In general, a liquid monomer mode process is conducted in a stirred bed or gas fluidized-bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; continuously withdrawing unreacted gases from the zone; and compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that substantially all the liquid present in the polymerization zone is adsorbed on or absorbed in the solid particulate matter.

Typically, the fluidized-bed polymerization process is conducted at a pressure ranging from about 10 to 1000 psi, preferably about 200 to about 600 psi and a temperature ranging from about 10° C. to about 150° C., preferably about 40° C. to about 125° C. During the polymerization process the superficial gas velocity ranges from about 0.7 to 3.5 feet/second, and preferably about 1.0 to 2.7 feet/second.

Catalysts

Any type of polymerization catalyst may be used in the polymerization process where the present invention is applied. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include:

A. Ziegler-Natta catalysts, including titanium based catalysts such as those described in U.S. Pat. Nos. 4,376,062 and 4,379,758. Ziegler-Natta catalysts are well known in the art, and typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as those described in U.S. Pat. No. 5,317,036.

D. Metallocene catalysts and other single-site or single-site-like catalysts such as those taught in U.S. Pat. Nos. 4,530,914; 4,665,047; 4,752,597; 5,218,071; 5,272,236; 5,278,272; 5,317,036; and 5,527,752.

E. Cationic forms of metal halides, such as aluminum trihalides.

F. Anionic Initiators such as butyl lithiums.

G. Cobalt catalysts and mixtures thereof such as those described in U.S. Pat. Nos. 4,472,559 and 4,182,814.

H. Nickel catalysts and mixtures thereof such as those described in U.S. Pat. Nos. 4,155,880 and 4,102,817.

I. Rare earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium bichloride), and allyl derivatives of such metals, e.g., of neodymium. Neodymium compounds, particularly neodymium neodecanoate, octanoate, and versatate, and n-alkyl neodymium are the most preferred rare earth metal catalysts.

Preferred catalysts for the process where the present invention is applied include rare earth metal catalysts, titanium catalysts, chromium catalysts, nickel catalysts, vanadium catalysts, and metallocene/single-site/single-site-like catalysts.

Inert Particulate Materials

The polymerization processes where the present invention is applied can include other additives such as inert particulate materials. Inert particulate particles can include, for example, carbon black, silica, clay, and talc used in some processes which produce sticky polymers such as in accordance with U.S. Pat. No. 4,994,534 and polymers from readily condensable monomers enumerated previously herein. The use of inert particulate materials is especially preferred in gas phase polymerization employing a diene as one of the monomers or when a diolefin is the sole monomer present. Of the inert particulate materials, carbon black, silica, and a mixture thereof are preferred, with carbon black being most preferred. The inert particulate material is employed in the gas-phase polymerization in an amount ranging from about 0.3 to about 80 weight percent, preferably about 5 to about 75 weight percent, most preferably 5 to 50 weight percent based on the weight of the final polymer product.

Local Defluidization/Channeling Detection

In a fluidized-bed, the change of a normal fluidization condition to local defluidization and/or channeling can be reflected by the variation of the fluidized bulk density signals collected at different locations. As is known in the art, Fluidized Bulk Density can be measured at different sections in the bed using a variety of methods, both invasively and non-invasively. Commonly employed methods include the measurement of bed capacitance, conductivity, pressure, and the use of fiber-optic laser Doppler enemometry, hot-wire anemometry, X-ray, (-ray and other techniques. The present invention proposes two preferred novel methods of converting fluidized bulk density data to signals useful for identifying incipient local defluidization and/or channeling in fluidizedbed polymerization reactors, namely (i) comparing the currently measured fluidization bulk density data with the time-averaged baselines of the fluidization bulk densities, or (ii) comparing the currently measured standard deviation of fluidized bulk density with its time-averaged baseline. For some processes chosen within the discretion of the operator, the time-averaged baselines can also or alternatively be determined according to historical "good" data.

Channeling Index

The channeling index (Cindex) is one of the two preferred parameters defined by this invention to monitor the local defluidization and/or channeling. Cindex is defined by $$Cindex = \left| \frac{|AUFBD - UFBD|}{AUFBD} - \frac{|ALFBD - LFBD|}{ALFBD} \right| \times 100$$

In a fluidized-bed reactor, the Fluidized Bulk Density (FBD) is usually measured both within the lower half and upper half of the bed. It is usually called Lower Fluidized Bulk Density or Upper Fluidized Bulk Density, depending on where it is measured. In the equation mentioned above, AUFBD and ALFBD are the baseline averages of upper fluidized bulk density and lower fluidized bulk density, respectively. UFBD and LFBD are the Current Upper and Lower Fluidized Bulk Densities, respectively. Practically, the baseline average of the fluidized bulk density is preferably a 0.1 to 24-hour filtered or non-filtered average, more preferably 0.25 hour to 15 hours, and most preferably a 1 to 5-hour filtered or non-filtered average of the instantaneous fluidized bulk density; and the current fluidized bulk density is preferably a 0.1 to 60-minute filtered or non-filtered average, and most preferably a 1 to 15-minute filtered or non-filtered average, of the instantaneous fluidized bulk density.

When the fluidized-bed reactor is running under normal conditions, the variations of upper and lower fluidized bulk densities are similar; hence the Cindex is relatively small with a typical value no larger than about 10–15%, and most commonly no larger than about 5–10%. While the channeling or local defluidization happens either in the lower half or the upper half of the bed, the variation of fluidized bulk density may be quite different at different portions of the bed. Where this is the case, Cindex will tend to be larger and typically may exceed 10%, and most commonly exceeds 15% or even 20%. Therefore, the Cindex can be used to detect the occurrence of local defluidization or channeling in an early stage and adjust the operating conditions of the reactor promptly to correct such an undesired situation.

Cindex is particularly useful in detecting the local defluidization and channeling occurring only at the bottom half of the bed or only at the top half of the bed. Although such kinds of local defluidization are common, local defluidization and channeling can also take place in different forms (e.g., occurring simultaneously at both the upper part and lower part of the bed). Therefore, another parameter, i.e., SDFBD, may be used to detect the local defluidization and channeling in other portions of the bed.

Standard Deviation of Fluidized Bulk Density (SDFBD)

Fluidized bulk density can be measured from several sections in the bed. For each section, the measured instantaneous fluidized bulk density is a random signal with the fluctuation mainly related to the bubble-induced turbulence in the section of the bed. However, when local defluidization or channeling happens in a section, the measured fluidized bulk density does not fluctuate as much as that under a normal fluidization condition. Mathematically, such a change can be reflected by the decrease of the standard deviation of the instantaneous fluidized bulk density. This factor is readily calculated and recognizable. Therefore, the standard deviation of Fluidized Bulk Density (SDFBD) is a preferred indicator of local defluidization or channeling.

SDFBD is defined as where $FBD_i$ is the instantaneous fluidized bulk density, and $\overline{FBD}$ is the N-point average value of $FBD_i$ in said sampling period and N is the total number of FBD data samples, which can be expressed by:

$$N = \frac{\text{Sampling Period}}{\text{Sampling Frequency of Data Acquisition}}$$

The Sampling Period is preferably selected between about 0.1 to 60 minutes, and most preferably selected between about 0.25 to 15 minutes. The Sampling Frequency of Data Acquisition is preferably between about 0.1 to 500 Hz, and most preferably between about 10 to 200 Hz.

When a significant drop of SDFBD is observed, a local defluidization or channeling can be defined and corresponding adjustment of the operating conditions can be performed to correct such an undesired condition. The local defluidization or channeling is typically recognized when SDFBD drops more than about 20%, and most commonly when SDFBD drops more than about 35%.

Practically, an analog data processor/computer or a digital processor/computer with relatively high data sampling frequency is employed for the calculation of SDFBD. On-line—that is, substantially instantaneous—calculation of Cindex and SDFBD are preferred for the "early" channeling and/or local defluidization detection, although off-line calculations may also be used. Cindex and SDFBD can be applied either together or separately for an early detection of incipient local defluidization or channeling.

Correction of Local Defluidization and/or Channeling

Upon the detection of local defluidization and/or channeling, prompt actions are needed to return the fluidized bed to normal conditions. These actions can typically include but are not limited to temporarily reducing the level of condensing, temporarily varying the superficial gas velocity, adjusting reactor operating conditions to reduce the particle stickiness, reducing electrostatic level in the reactor, and similar steps.

All patents mentioned in the specification are hereby incorporated by reference.

The following examples further illustrate the present invention.

EXAMPLES

All the following examples are related to the commercial scale operations conducted in gas phase fluidized-bed polymerization reactors with a geometric configuration similar to that of FIG. 1.

Example 1

The reactor size was H=39 ft, D=11.5 ft. (See FIG. 1). Ethylene-butene copolymers were made in the reactor. Lower fluidized bulk density was measured from a section of the bed between 0.5 feet and 5.5 feet above the distributor plate, respectively. Upper fluidized bulk density was measured from a section of the bed between 8.9 feet and 26.7 feet above the distributor plate, respectively. The baseline averages of the fluidized bulk densities, AUFBD and ALFBD, were 3-hour non-filtered average of the instantaneous fluidized bulk densities. The current fluidized bulk densities, UFBD and LFBD, were 10-minute non-filtered averages of the instantaneous fluidized bulk densities. The reactor underwent a product transition from Product A to Product B. Detailed operating conditions for those two products are

| | Product A | Product B |
|---|---|---|
| Resin Density (g/cc) | 0.9180 | 0.9200 |
| Resin Melt Index (g/10 min.) | 1.00 | 0.76 |
| Reactor Temperature (° C.) | 88 | 91 |
| Reactor Pressure (psig) | 307 | 308 |
| Ethylene Partial Pressure (psi) | 120 | 175 |
| Production Rate (lb/hr) | 38,000 | 31,000 |
| Space-Time-Yield (lb/hr-ft$^3$) | 9.4 | 7.7 |
| Weight-Averaged Particle Size (in.) | 0.04 | 0.028 |
| Catalyst | Titanium-based catalyst | Chromium-based catalyst |
| Catalyst Support | Silica | Silica |
| Superficial Gas Velocity (ft/s) | 2.40 | 2.40 |

During the transition from Product A to Product B, a sharp change of all the operation conditions involved was made, and Cindex indicated a channeling or local defluidization happening in the bed. The Cindex record is reproduced in FIG. 2. No immediate action was taken to correct the channeling of the fluidized bed. The product transition was not successful, and the reactor operation was terminated.

Example 2

The reactor size was H=50 ft, D=14.5 ft. Ethylene-hexene copolymers were made in the reactor. Upper fluidized bulk density was measured from a section of the bed between 13.75 and 36 feet above the distributor plate. Lower fluidized bulk density was measured from a section of the bed between 0.5 feet and 13.75 feet above the distributor plate. The baseline averages of the fluidized bulk densities, AUFBD and ALFBD, were 3-hour non-filtered averages of the instantaneous fluidized bulk densities. The current fluidized bulk densities, UFBD and LFBD, were 10-minute non-filtered averages of the instantaneous fluidized bulk densities. The reactor underwent a product transition from Product A to Product B. Detailed operating conditions for those two products are

| | Product A | Product B |
|---|---|---|
| Resin Density (g/cc) | 0.9485 | 0.9535 |
| Resin Flow Index (g/10 min.) | 28 | 27 |
| Reactor Temperature (° C.) | 104 | 105 |
| Reactor Pressure (psig) | 308 | 306 |
| Ethylene Partial Pressure (psi) | 190 | 180 |
| Production Rate (lb/hr) | 54,000 | 51,000 |
| Space-Time-Yield (lb/hr-ft$^3$) | 6.5 | 6.2 |
| Weight-Averaged Particle Size (in.) | 0.030 | 0.027 |
| Catalyst | Chromium-based catalyst | Chromium-based catalyst |
| Catalyst Support | Silica | Silica |
| Superficial Gas Velocity (ft/s) | 2.5 | 2.5 |

During the transition from Product A to Product B, a smooth change of the operation conditions was made following an optimized process control strategy. The operating conditions of the reactor were adjusted in a manner to allow continuous production through the product transition. The superficial gas velocity, reactor pressure, bed temperature, production rate, and gas composition were varied at a rate no more than 25% per hour. Cindex indicated a good fluidization without channeling or local defluidization (see FIG. 3). The product transition was successful.

Example 3

Same as Example 1, except the product transition was conducted in a different manner than that of Example 1. During the transition from Product A to Product B, Cindex indicated the occurrence of local defluidization and/or channeling. After detecting that problem, a series of actions was taken, including temporarily reducing the level of condensing from 8.5% by weight (based on total weight of fluidizing medium) to 5.5% by weight, and temporarily increasing the superficial gas velocity from 2.3 ft/sec to 2.4 ft/sec, as well as adjusting the transition procedure. The local defluidization and/or channeling was corrected (see FIG. 4, showing the improvement in Cindex after about 750 minutes), and the product transition was successful.

Example 4

The reactor size was H=39 ft, D=8 inches. The ethylene-butene copolymer made in the reactor were the same as Product A in Example 1, with the same catalyst. Fluidized bulk density signals and SDFBDs are measured from three sections of the bed, i.e. between 0.5 ft and 5 ft, 8 ft and 14 ft, 18 ft and 24 ft above the distributor plate, respectively. A one minute sampling period and a 100 Hz sampling frequency were employed. The level of condensing was gradually increased, starting from the "dry mode" (i.e., zero percent of condensing). Samples of resin particles were collected from a sampling port above the distributor plate. Liquid content in the resin sample was analyzed as soon as the sample was collected. A plot of relative SDFBD between 0.5 ft and 5 ft above the distributor plate versus the liquid content in the resin sample can be seen in FIG. 5. When the liquid content exceeded about 10 wt %, SDFBD had a sharp drop over 60%, accompanied by the other operational problems of local defluidization and channeling (such as the vigorous variation of pressure drop across the distributor plate, difficulty in discharging product from the reactor, large temperature variations in the reactor, degraded product quality, particle agglomeration, etc.). With the further increase of liquid content in the particle samples, eventually the reactor became very difficult to operate even with the tolerance of a severe product quality degradation. This example clearly illustrated the capability of SDFBD in monitoring local defluidization and/or channeling in fluidized-bed reactors.

What is claimed is:

1. Method of monitoring local defluidization and channeling in a fluidized-bed polymerization reactor comprising continuously or intermittently comparing a signal which is a function of currently measured fluidized bulk density in said fluidized bed with a signal which is a function of time-averaged baseline of fluidized bulk density in said fluidized bed.

2. Method of claim 1 wherein said comparing is accomplished according to the channeling index, Cindex, which is generated from the processing of fluidized bulk density signals from two levels in said fluidized bed, and is defined by $$Cindex = \left| \frac{|AUFBD - UFBD|}{AUFBD} - \frac{|ALFBD - LFBD|}{ALFBD} \right| \times 100$$

where AUFBD is said baseline average of an upper fluidized bulk density, ALFBD is said baseline average of a lower fluidized bulk density, UFBD is said currently measured upper fluidized bulk density, and LFBD is said currently measured lower fluidized bulk density.

3. The method of claim 1 wherein said comparing is accomplished by continuously or intermittently monitoring the standard deviation of fluidized bulk density, SDFBD, which is defined by $$N = \frac{\text{Sampling Period}}{\text{Sampling Frequency of Data Acquisition}}$$

where $FBD_i$ is the fluidized bulk density, $\overline{FBD}$ is the N-point average value of $FBD_i$ in said sampling period and N is the total number of $FBD_i$ data sampled.

4. The method of claim 1 wherein the fluidized-bed reactor is used for polymerizing monomers comprising (a) at least one alpha olefin and optionally a diene or (b) one or more diolefins, comprising polymerizing said monomers in the presence of at least one polymerization catalyst.

5. Method of claim 1 wherein said fluidized bed reactor includes an inert particulate material in its fluidized bed.

6. The method of claim 2 wherein AUFBD and ALFBD are filtered or non-filtered averages of the instantaneous upper and lower fluidized bulk densities in a time range from about 0.1 hour to about 24 hours, and UFBD and LFBD are filtered or non-filtered averages of the instantaneous upper and lower fluidized bulk densities in the time range from about 0.1 minute to about 60 minutes.

7. The method of claim 2 wherein AUFBD and ALFBD are filtered or non-filtered averages of the instantaneous upper and lower fluidized bulk densities in a time range from about 0.25 hour to about 15 hours, and UFBD and LFBD are filtered or non-filtered averages of the instantaneous upper or lower fluidized bulk densities in the time range from about 1 minute to about 15 minutes.

8. The method of claim 3 wherein the Sampling Period is between about 0.1 to 60 minutes and the Sampling Frequency of Data Acquisition is between about 0.1 to 500 Hz.

9. Method of claim 3 wherein the Sampling Period is between 0.25 and 15 minutes, and the Sampling Frequency of Data Acquisition is between 10 and 200 Hz.

10. The method of claim 2 wherein a local defluidization and/or channeling warning is provided when Cindex is larger than about 10%.

11. Method of claim 2 wherein a warning is provided when Cindex is greater than about 15%.

12. The method of claim 3 wherein a local defluidization and/or channeling warning is provided when SDFBD drops more than about 20% within said sampling period.

13. Method of claim 3 wherein a local defluidization and/or channeling warning is provided when SDFBD drops more than about 25% within said sampling period.

14. The method of claim 1 followed by changing the superficial gas velocity when the signal which is a function of currently measured fluidized bulk density differs from the signal which is a function of baseline fluidized bulk density by more than a predetermined value, whereby said local defluidization is inhibited.

15. The method of claim 1 wherein said comparing is performed while said reactor is in the condensing mode and wherein said condensing is modified to inhibit local defluidization.

16. The method of claim 1 followed by adjusting reactor operating conditions to reduce the particle stickiness, whereby said local defluidization is inhibited.

17. The method of claim 1 followed by reducing the electrostatic level in said reactor, whereby said local defluidization in inhibited.

18. The method of claim 2 wherein the Cindex is calculated on-line.

19. Method of claim 3 wherein SDFBD is calculated on-line.

20. The method of claim 1 wherein polymer produced is selected from the group consisting of
   (a) homopolymers and copolymers of $C_2$–$C_{18}$ alpha olefins;
   (b) ethylene-propylene-diene terpolymers;
   (c) polybutadiene;
   (d) polyisoprene;
   (e) polystyrene;
   (f) polychloroprene;
   (g) polymers of butadiene copolymerized with styrene or isoprene;
   (h) polymers of butadiene copolymerized with acrylonitrile;
   (i) polymers of isobutylene copolymerized with isoprene; and
   (j) ethylene-butene rubbers and ethylene-butene-diene rubbers.

21. The method of claim 1 wherein said polymerization is of at least one alpha olefin having from 2 to 8 carbon atoms.

22. Method of claim 20 wherein an inert particulate material selected from the group consisting of carbon black, silica, clay, talc, and mixtures thereof is suspended in said fluidized bed.

23. Method of controlling an olefin polymerization reactor to inhibit defluidization and channeling therein comprising adjusting conditions in said reactor to maintain a predetermined relationship in said reactor between (a) fluidized bulk density in said reactor and (b) a time-averaged baseline of fluidized bulk density.

24. Method of claim 23 wherein said predetermined relationship is monitored by Cindex.

25. Method of claim 23 wherein said predetermined relationship is monitored by the standard deviation of fluidized bulk density, SDFBD, which is $$N = \frac{\text{Sampling Period}}{\text{Sampling Frequency of Data Acquisition}}$$

where $FBD_i$ is the fluidized bulk density $$\overline{FBD}$$

is the N-point average value of $FBD_i$ in said sampling period and N is the total number of $FBD_i$ data sampled.

26. Method of claim 23 wherein fluid is withdrawn and recycled in said reactor, and said conditions are adjusted by adjusting the amount of liquid in said recycle fluid.

27. Method of claim 23 wherein said conditions are adjusted by adjusting the superficial gas velocity in said reactor.

* * * * *